US011703097B2

(12) United States Patent
Elstorpff et al.

(10) Patent No.: US 11,703,097 B2
(45) Date of Patent: Jul. 18, 2023

(54) PULL ROD DEVICE ARRANGEMENT OF A BRAKE CALIPER AND BRAKE CALIPER

(71) Applicant: KNORR-BREMSE SYSTEME FÜR SCHIENENFAHRZEUGE GMBH, Munich (DE)

(72) Inventors: Marc-Gregory Elstorpff, Munich (DE); Balázs Hauer, Budapest (HU); Attila Fülöp, Budapest (HU)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 331 days.

(21) Appl. No.: 16/980,248

(22) PCT Filed: Mar. 12, 2019

(86) PCT No.: PCT/EP2019/056148
§ 371 (c)(1),
(2) Date: Sep. 11, 2020

(87) PCT Pub. No.: WO2019/175164
PCT Pub. Date: Sep. 19, 2019

(65) Prior Publication Data
US 2021/0033160 A1 Feb. 4, 2021

(30) Foreign Application Priority Data
Mar. 12, 2018 (EP) .................... 18161298

(51) Int. Cl.
*F16D 65/18* (2006.01)
*B61H 5/00* (2006.01)
*F16D 55/224* (2006.01)
(52) U.S. Cl.
CPC ............ *F16D 65/183* (2013.01); *B61H 5/00* (2013.01); *F16D 55/2245* (2013.01)

(58) Field of Classification Search
CPC .... F16D 55/224; F16D 55/2245; F16D 65/16; F16D 65/18; F16D 65/183
USPC ........... 188/59, 72.2, 72.4, 72.6–72.9, 79.55, 188/153 R
See application file for complete search history.

(56) References Cited

U.S. PATENT DOCUMENTS

| 3,651,897 | A | | 3/1972 | Hahn | |
| 5,579,873 | A | * | 12/1996 | Kohar | ...................... B61H 5/00 188/73.31 |
| 5,813,499 | A | * | 9/1998 | Staltmeir | ................. B61H 5/00 188/59 |

(Continued)

FOREIGN PATENT DOCUMENTS

| CN | 101006285 A | 7/2007 |
| CN | 101427043 A | 5/2009 |

(Continued)

OTHER PUBLICATIONS

International Search Report and Written Opinion corresponding to PCT/EP2019/056148, dated Jun. 21, 2019.

*Primary Examiner* — Christopher P Schwartz
(74) *Attorney, Agent, or Firm* — Barnes & Thornburg LLP

(57) ABSTRACT

A pull rod device arrangement of a brake caliper includes a pull rod top, a pull rod bottom, and two vertical rods, wherein the pull rod top and the pull rod bottom of the pull rod device are connected to each other. The pull rod top and the pull rod bottom of the pull rod device are designed as separate parts. A brake caliper includes the pull rod device.

19 Claims, 14 Drawing Sheets

(56) References Cited

U.S. PATENT DOCUMENTS 8,006,812 B2* 8/2011 Emilsson ............ F16D 55/2245
188/59
2012/0043168 A1* 2/2012 Narayanan V ........ F16D 65/095
188/250 F

FOREIGN PATENT DOCUMENTS

| CN | 102128227 A | 7/2011 |
|---|---|---|
| CN | 103038120 A | 4/2013 |
| CN | 103101555 A | 5/2013 |
| CN | 103443492 A | 12/2013 |
| CN | 105307913 A | 2/2016 |
| CN | 106662182 A | 5/2017 |
| CN | 206221549 U | 6/2017 |
| DE | 4206342 A1 | 9/1993 |
| EP | 2940339 A1 | 11/2015 |
| GB | 374626 A | 6/1932 |
| GB | 1318193 A | 5/1973 |
| JP | 2017198226 A | 11/2017 |

* cited by examiner

STATE OF THE ART

STATE OF THE ART

STATE OF THE ART

PULL ROD DEVICE ARRANGEMENT OF A BRAKE CALIPER AND BRAKE CALIPER

PRIORITY CLAIM AND CROSS REFERENCE

This patent application is a U.S. National Phase of International Patent Application No. PCT/EP2019/056148 filed Mar. 12, 2019, which claims priority to European Patent Application No. 18161298.7, the disclosure of which being incorporated herein by reference in their entireties.

FIELD

Disclosed embodiments relate to a pull rod device arrangement of a brake caliper of a disc brake, particularly for a rail vehicle, and a brake caliper of a disc brake, particularly for a rail vehicle, having such a pull rod device.

BACKGROUND

Pull rod devices of brake calipers as well as brake calipers are well known and used e.g., in disc brakes of rail vehicles.

SUMMARY

There is always a need to save costs, weight, and installation space while maintaining or/and increasing quality. Disclosed embodiments provide an improved pull rod device of a brake caliper of a disc brake and an improved brake caliper of a disc brake.

BRIEF DESCRIPTION OF THE FIGURES

Disclosed embodiments will be better understood by the following description, given with reference to the drawings, which illustrate the embodiments, and in which.

DETAILED DESCRIPTION

Figure 1:
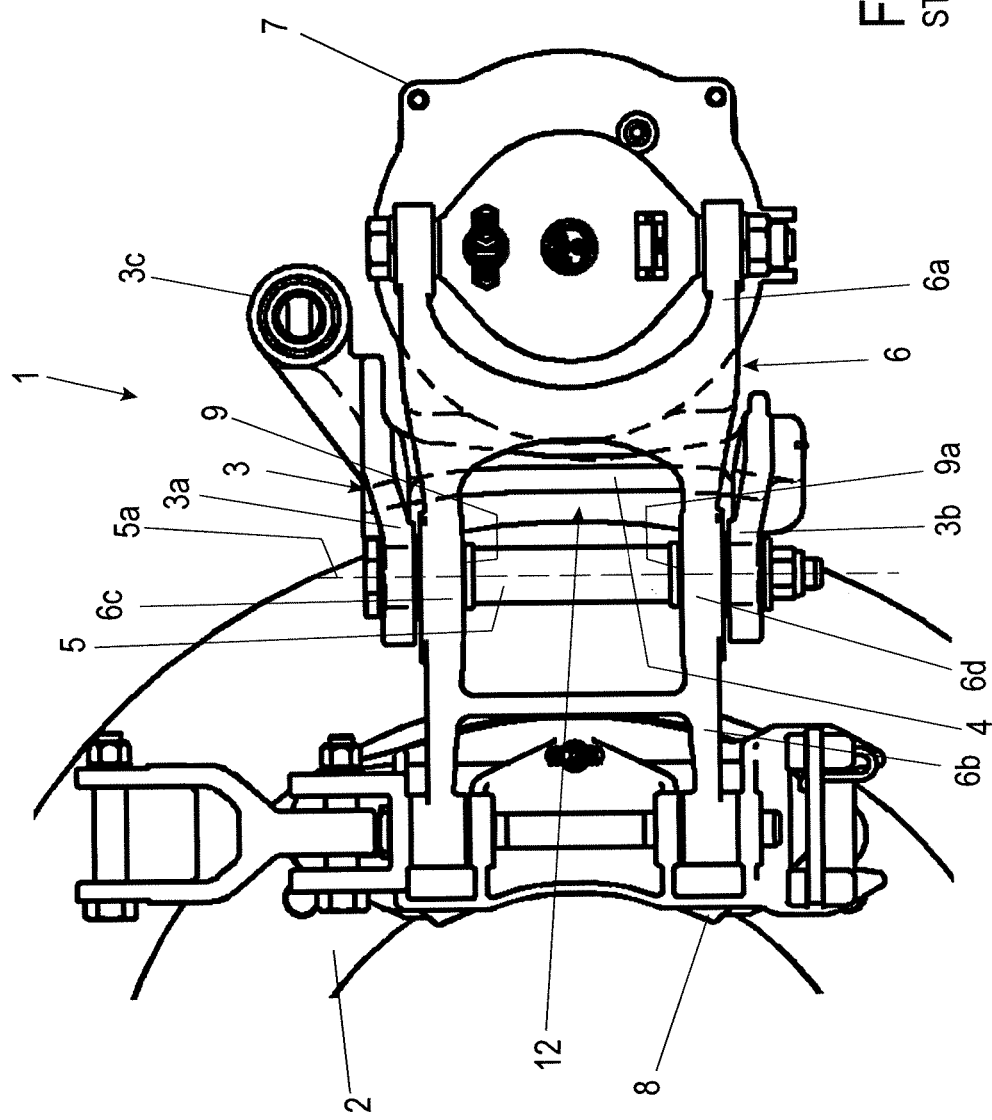
FIG. 1 shows a lateral view of a state-of-the-art disc brake.
Figure 2:
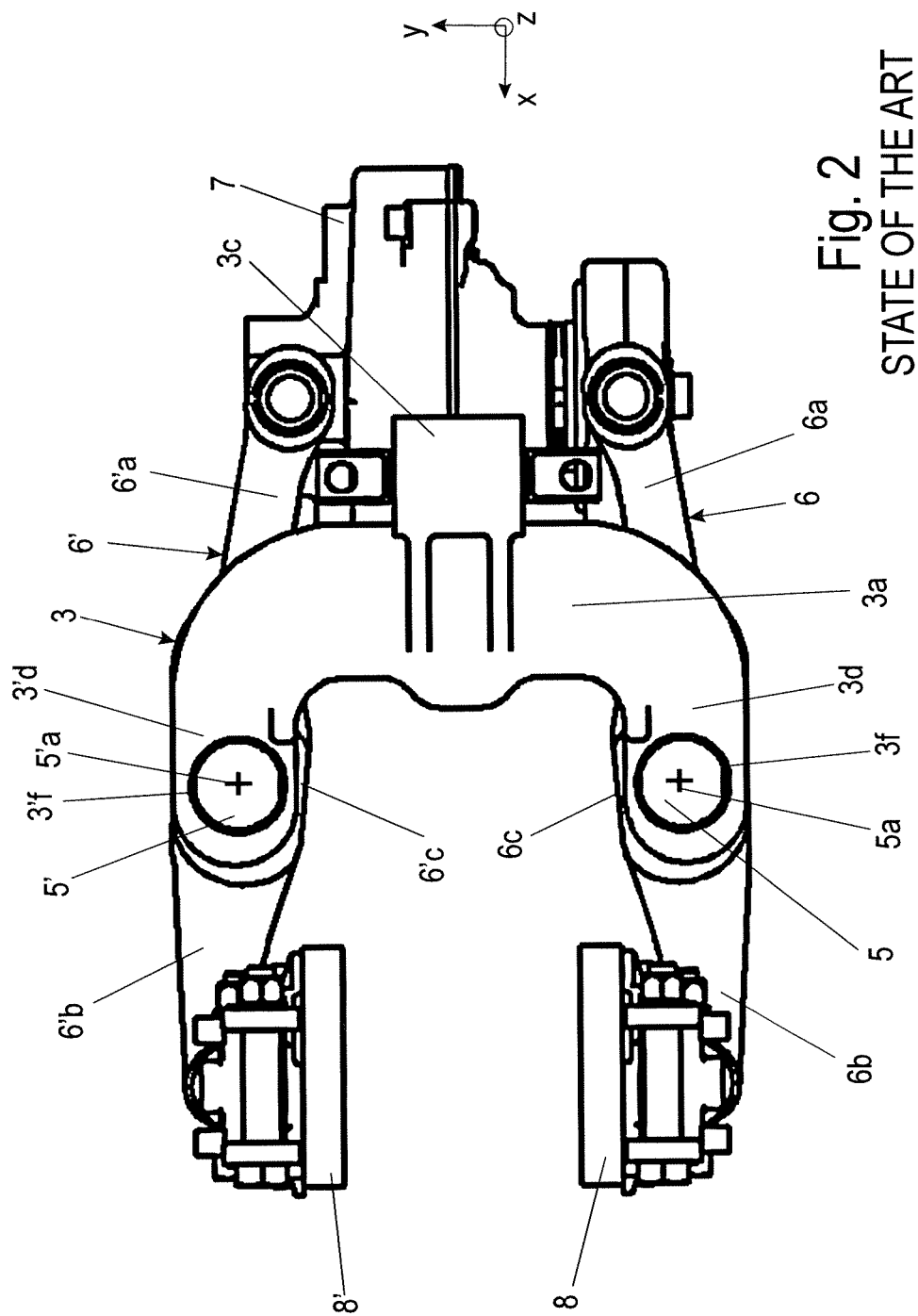
FIG. 2 shows a top view of a state-of-the-art pull rod device of the brake caliper of FIG. 1.
Figure 3:
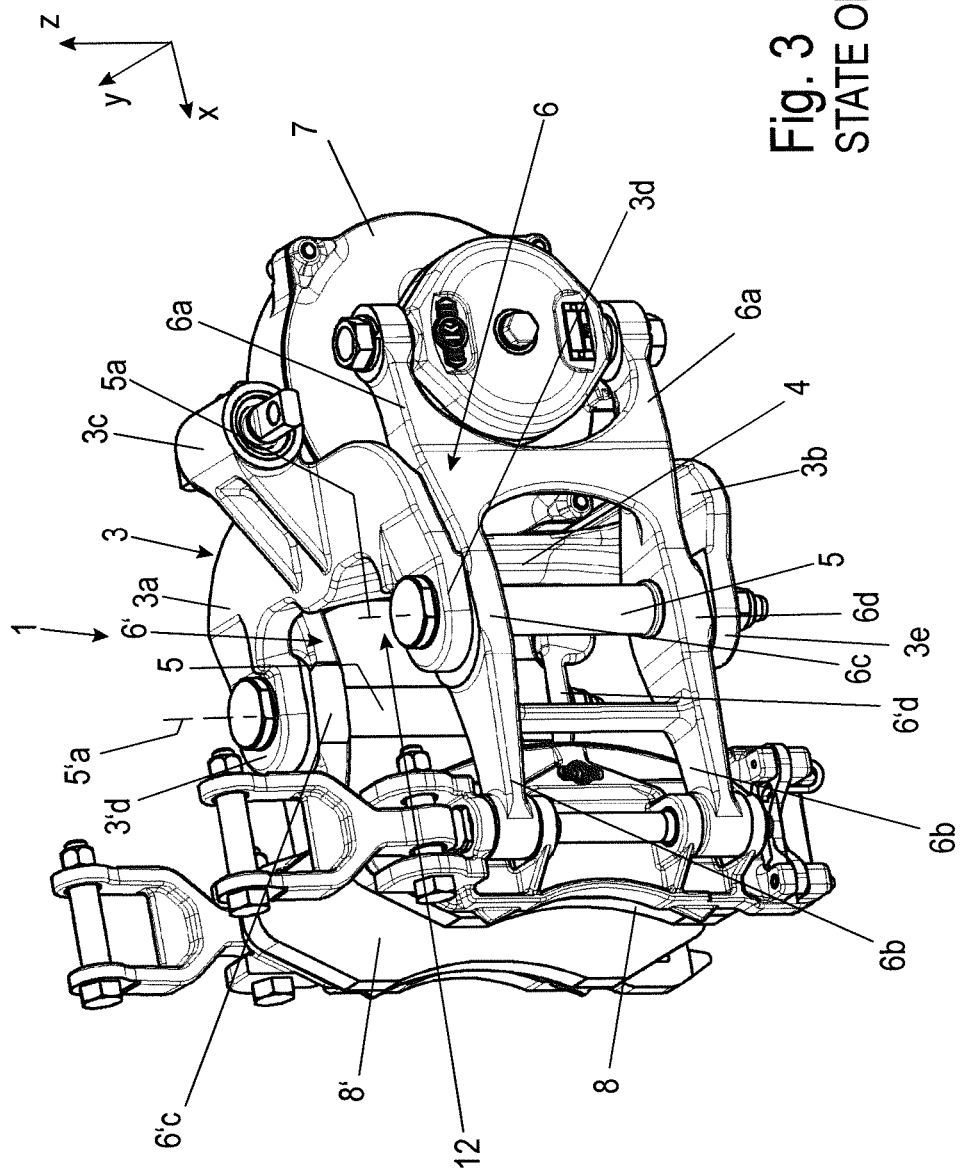
FIG. 3 is a perspective view of the state-of-the-art brake caliper of FIG. 1.
Figure 4:
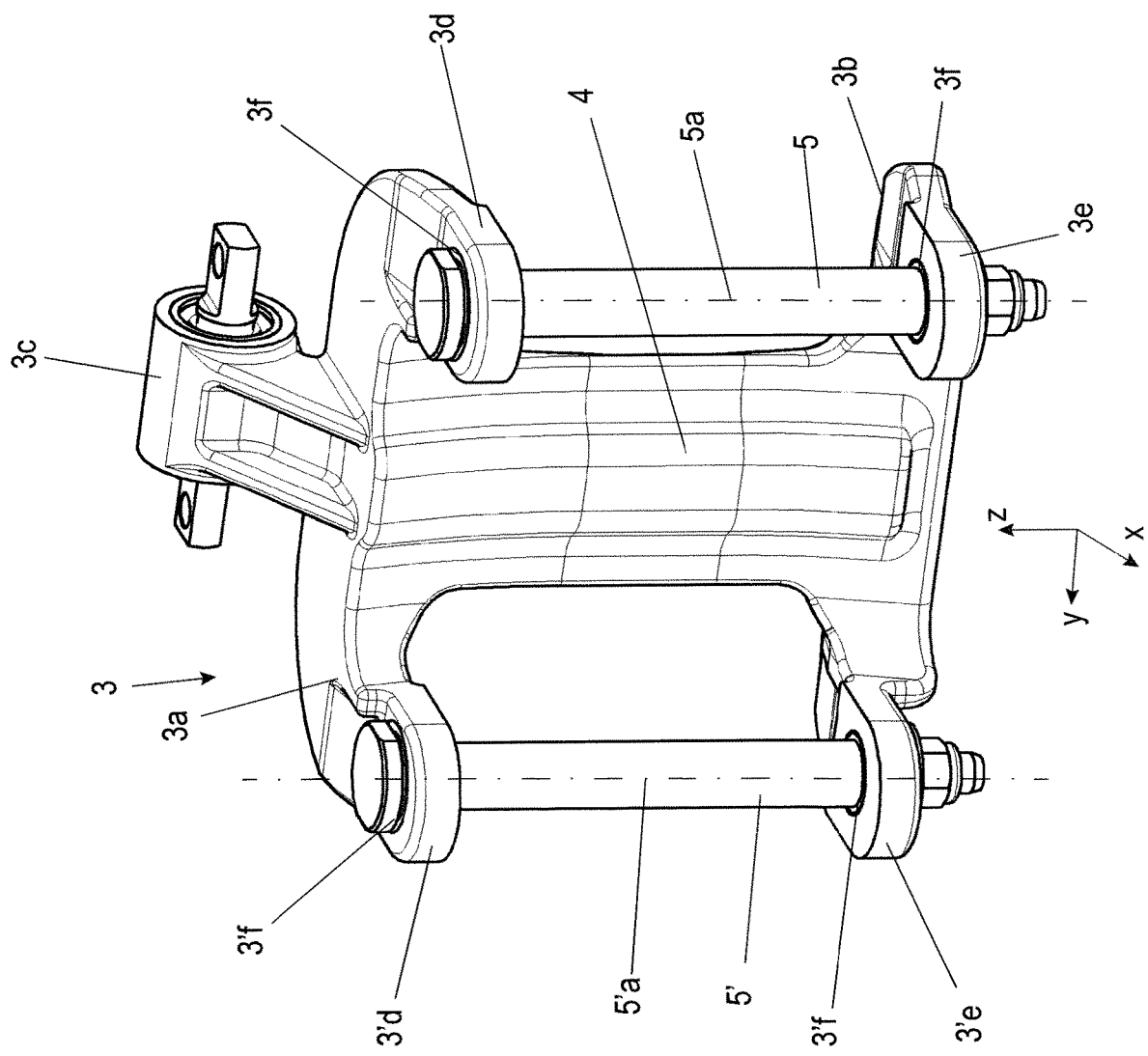
FIG. 4 is a perspective view of the state-of-the-art pull rod device of FIG. 2.

A state-of-the-art example of a brake caliper with a pull rod device is shown in the FIGS. 1 to 4. FIG. 1 shows a lateral view of a state-of-the-art brake caliper 1. A top view of a state-of-the-art pull rod device 3 of the brake caliper 1 of FIG. 1 is shown in FIG. 2. FIG. 3 is a perspective view of the state-of-the-art brake caliper 1 of FIG. 1. And FIG. 4 depicts a perspective view of the state-of-the-art pull rod device 3 of FIG. 2.

Coordinates x, y, z are used for orientation. The x-axis runs in the direction of travel of an assigned rail vehicle. The y-axis is parallel to a rotational axis of a brake disc 2. And the z-axis is a vertical axis.

The statements "right", "left", "top", and "bottom" refer only to the arrangements in the respective figures.

Reference signs with apostrophes are used in order to distinguish parts on one side of the brake disc 2 from parts on the other side of the brake disc 2.

The brake caliper 1 includes the pull rod device 3, two vertical rods 5, 5', two brake levers 6, 6', a brake cylinder 7, and two brake pads 8, 8'.

The pull rod device 3 acts as a fix point of each of the brake levers 6, 6' and it connects the brake levers 6, 6'. One of the two brake levers 6, 6' is arranged on each side of the brake disc 2. The two brake levers 6, 6' are attached to the pull rod device 3 via the vertical rods 5, 5'. Each vertical rod 5, 5' supports one of the two brake levers 6, 6'. Each brake lever 6, 6' can swivel around a respective axis 5a, 5'a of the respective vertical rod 5, 5'.

Each brake lever 6, 6' includes a first lever arm 6a, 6'a and a second lever arm 6b, 6'b, which are connected via a central bearing portion 6c, 6'c. In the shown example, each brake lever 6, 6' includes two arrangements of the first lever arm 6a, 6'a, the second lever arm 6b, 6'b and the central bearing portion 6c, 6'c. These arrangements are spaced in parallel to each other in z-direction and are connected via webs (without reference signs).

Free ends of the first lever arms 6a, 6'a are connected to the brake cylinder 7 on the right hand side. The central bearing portions 6c, 6'c are pivotally attached to the vertical rods 5, 5' via bearings 9, 9a, 9', 9'a, e.g., bearing bushes. In this way, the brake levers 6, 6' can pivot around the respective vertical axis 5a, 5'a.

Each one of the two brake pads 8, 8' is attached to the respective free ends of the second lever arms 6b, 6'b on the left hand side. The brake disc 2 is arranged in between the two brake pads 8, 8'.

The pull rod device 3 is a single-piece design, and generally includes a pull rod top 3a, a pull rod bottom 3b, a pull rod head 3c with a fixation point, and at least one vertical pull rod rib 4.

The vertical pull rod rib 4 connects the pull rod top 3a and the pull rod bottom 3b and transfers vertical and longitudinal forces from the pull rod bottom 3b to the pull rod top 3a. The vertical pull rod rib 4 is mainly loaded by mass forces and keeps the distance between the pull rod top 3a part (including pull rod head 3c) and the pull rod bottom 3b part in vertical z-direction. The pull rod head 3c is attached or connected to the pull rod top 3a.

The vertical pull rod rib 4 is located within a space 12 between the pull rod top 3a and the pull rod bottom 3b.

The pull rod top 3a and the pull rod bottom 3b extend in y-direction. The pull rod top 3a is equipped with two parallel arms 3d, 3'd each extending in x-direction. Each arm 3d, 3'd has a fastening boring 3f, 3'f. Similarly, the pull rod bottom 3b also has two parallel arms 3e, 3'e each extending in x-direction and having a fastening boring 3f, 3'f. The two arms 3d and 3e as well as the two arms 3'd and 3'e are spaced in parallel to each other in z-direction in such a way that each two fastening borings 3f and 3'f are coaxial to each other.

The vertical rods 5, 5' are inserted in the fastening borings 3f, 3'f and connected to the pull rod device 3 by a simple bush-pin connection. In this manner, the vertical rods 5, 5' transfer forces from the brake levers 6, 6' to the pull rod device 3.

In most cases, the pull rod device 3 is part of a mounting interface. The pull rod device 3 is connected to the assigned rail vehicle, e.g., to a bogie of the rail vehicle. In the shown example, the pull rod head 3c fixes the pull rod device 3 to the vehicle.

During service braking the brake cylinder 7 is actuated and the brake levers 6, 6' are pressed outwards. The pull rod device 3 takes up the pull force between the brake levers 6, 6' and therefore, the brake pads 8, 8' on the opposite side of the brake levers 6, 6' are pressed inwards against the brake disc 2.

There is always a need to save costs, weight, and installation space while maintaining or/and increasing quality.

Disclosed embodiments provide an improved pull rod device of a brake caliper of a disc brake and an improved brake caliper of a disc brake. A pull rod is realized with separate parts and without the vertical pull rod rib. An inventive pull rod device arrangement of a brake caliper includes a pull rod top, a pull rod bottom, and two vertical rods, wherein the pull rod top and the pull rod bottom of the pull rod device are connected to each other. The pull rod top and the pull rod bottom of the pull rod device are designed as separate parts. An advantage of the disclosed embodiments is that the weight of the pull rod device is reduced compared with the state-of-the-art pull rod device.

In accordance with disclosed embodiments, an inventive brake caliper includes a pull rod device, two vertical rods, two brake levers, a brake cylinder, and two brake pads. The pull rod device includes a pull rod top and a pull rod bottom, the pull rod top and the pull rod bottom being designed as separate parts.

An advantage of this solution is that the brake levers can be shortened and the installation space can be reduced. Additionally, shortened brake levers can reduce the weight of the brake caliper.

In a disclosed embodiment, the pull rod top and the pull rod bottom of the pull rod device being separate parts are connected to each other by the two vertical rods. Therefore, no additional part or structure is necessary.

Another embodiment provides that the pull rod top has a triangular shape, wherein two side portions form mirror-inverted lateral triangle legs having their vertex in a connection. In this way, a stable design form can be achieved.

In a further embodiment a pull rod head is attached to the connection and is provided for mounting the pull rod device. This is a compact design.

Another further embodiment provides that each free end of the side portions is connected to a respective support portion, wherein transition areas of each connection of the side portions and the respective support portions are spaced apart and are connected via a cross-connector. The cross-connector can have a crescent-shape, which is bent to the connection. A stable design can be achieved.

In one embodiment each support portion has a fastening boring, in which top ends of the vertical rods 5, 5' are inserted. This facilitates an easy assembling.

It is advantageous that the pull rod bottom has a crescent shape, wherein each end of the rod bottom is connected to a respective support portion, each support portion having a fastening boring, in which bottom ends of the vertical rods are inserted.

An advantageous compact design can be achieved, when the pull rod bottom is arranged in a plane parallel to the pull rod top, the fastening borings of the support portions of the pull rod bottom being coaxially arranged to the fastening borings of the support portions of the pull rod top.

In a preferred embodiment the pull rod top and the pull rod bottom are spaced apart from each other and connected via the vertical rods, the vertical rods being connected via their top ends inserted into the fastening borings of the support portions of the pull rod top and being connected via their bottom ends inserted into the fastening borings of the support portions of the pull rod bottom. There are no additional parts, and the design is easy to assemble. So the function of the state-of-the-art pull rod rib is taken over by the vertical rods. The vertical rods are connected to the pull rod top part in a way permitting to transfer vertical forces and bending moments.

In a further embodiment the top ends of the vertical rods are connected to the support portions of the pull rod top via press fit connections, and the bottom ends of the vertical rods are fastened to the support portions of the pull rod bottom in a usual way, e.g., by fastening elements. The press fit connection is insensitive against vibrations and permits a transfer of vertical forces and bending moments.

In an alternative embodiment, the pull rod top includes two side portions, two support portions, a connection and a pull rod head, wherein each free end of the side portions is connected to a respective support portion and each other end of the side portions is connected with the connection, wherein each support portion has a fastening boring, in which top ends of the vertical rods are inserted. This is advantageous due to a reduced weight and size.

A middle part of the connection of the pull rod top is widened, wherein a pull rod head is attached to the connection and is provided for mounting the pull rod device. In this way, the connection is advantageously strengthened.

A further embodiment provides that the pull rod bottom includes two support portions and a pull rod bottom body, wherein ends of the two support portions are fixed to the pull rod bottom body via respective connection segments, each support portion having a fastening boring, in which bottom ends of the vertical rods are inserted.

It is advantageous, that a middle part of the pull rod bottom body is widened, because the pull rod bottom body can be strengthened in that way.

In another further embodiment the pull rod top and the pull rod bottom are spaced apart from each other and connected via the vertical rods, the vertical rods being connected via their top ends inserted into the fastening borings of the support portions of the pull rod top and being connected via their bottom ends inserted into the fastening borings of the support portions of the pull rod bottom. This is advantageous-because no additional part or structure—except for a few small parts like screw, washer, nut—is necessary.

It is advantageous in a further embodiment that the top ends of the vertical rods are connected to the support portions of the pull rod top via press fit connections, and that the bottom ends of the vertical rods are fastened to the support portions of the pull rod bottom in a usual way, e.g., by fastening elements.

Alternatively at least one of the connections of the vertical rods to one of the support portions is a threaded connection, which is easy to assemble.

In another embodiment at least one of the vertical rods is kept in place by a respective preloaded screw, which is easy to assemble.

Another alternative embodiment provides that at least one of the fastening borings of the pull rod top is arranged in parallel to one opposite boring of the fastening borings of the pull rod bottom, wherein the associate vertical rod has a cranked end in z-shape. One advantage is that there is a larger space between the rods.

In a further embodiment at least one of the vertical rods includes multiple parts, which are kept in place by a preloaded screw. This is advantageous because the rods can be easily adapted to different lengths.

Another embodiment provides that suspension clips of an associated brake caliper are connected the pull rod device.

The brake caliper includes the pull rod device described above.

FIGS. 1 to 4 depict an example of the state of the art. A description of these figures is already given in the introduction above.

Figure 5:
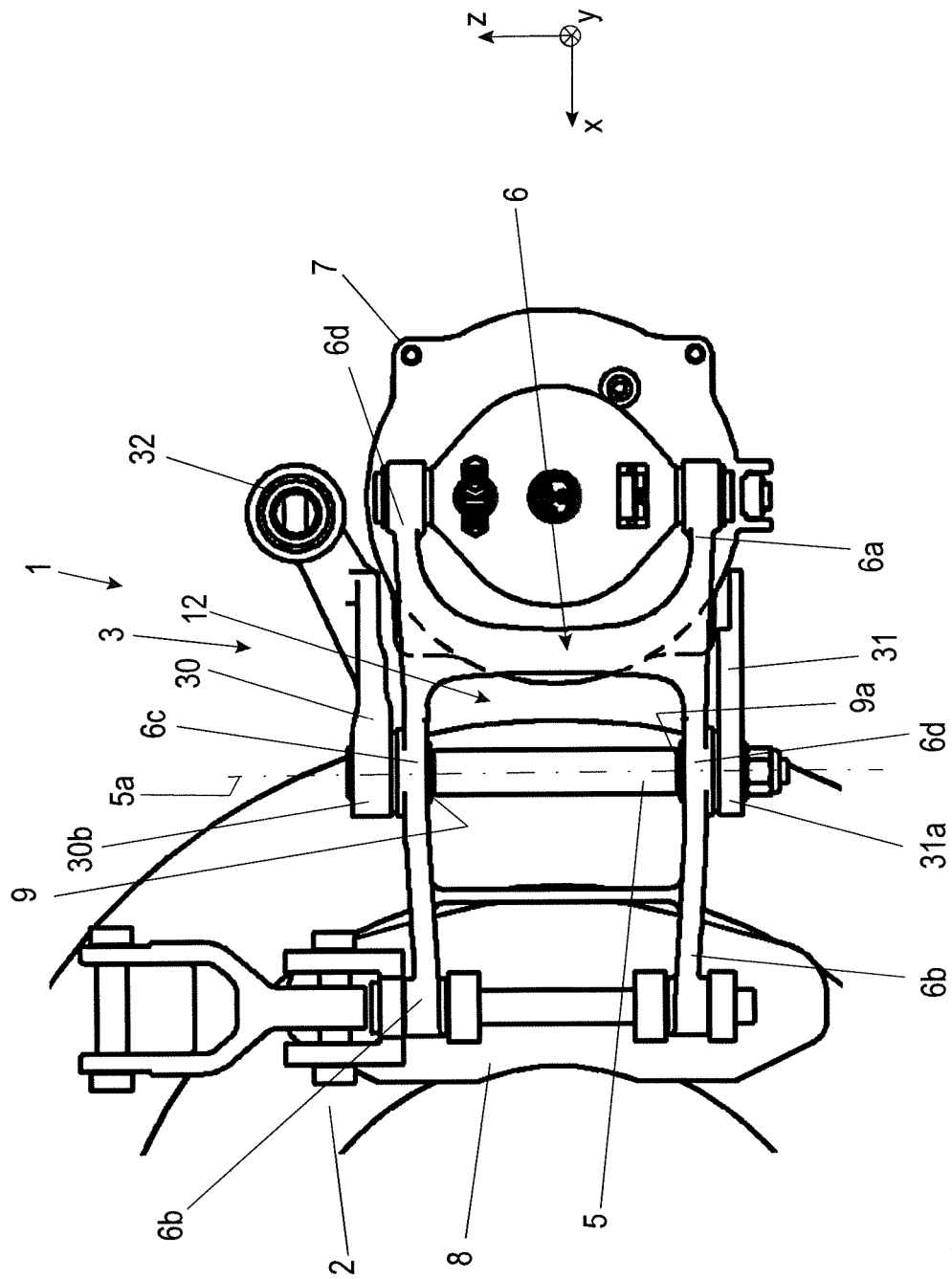
FIG. 5 shows a lateral view of an exemplary embodiment of a brake caliper.
Figure 6:
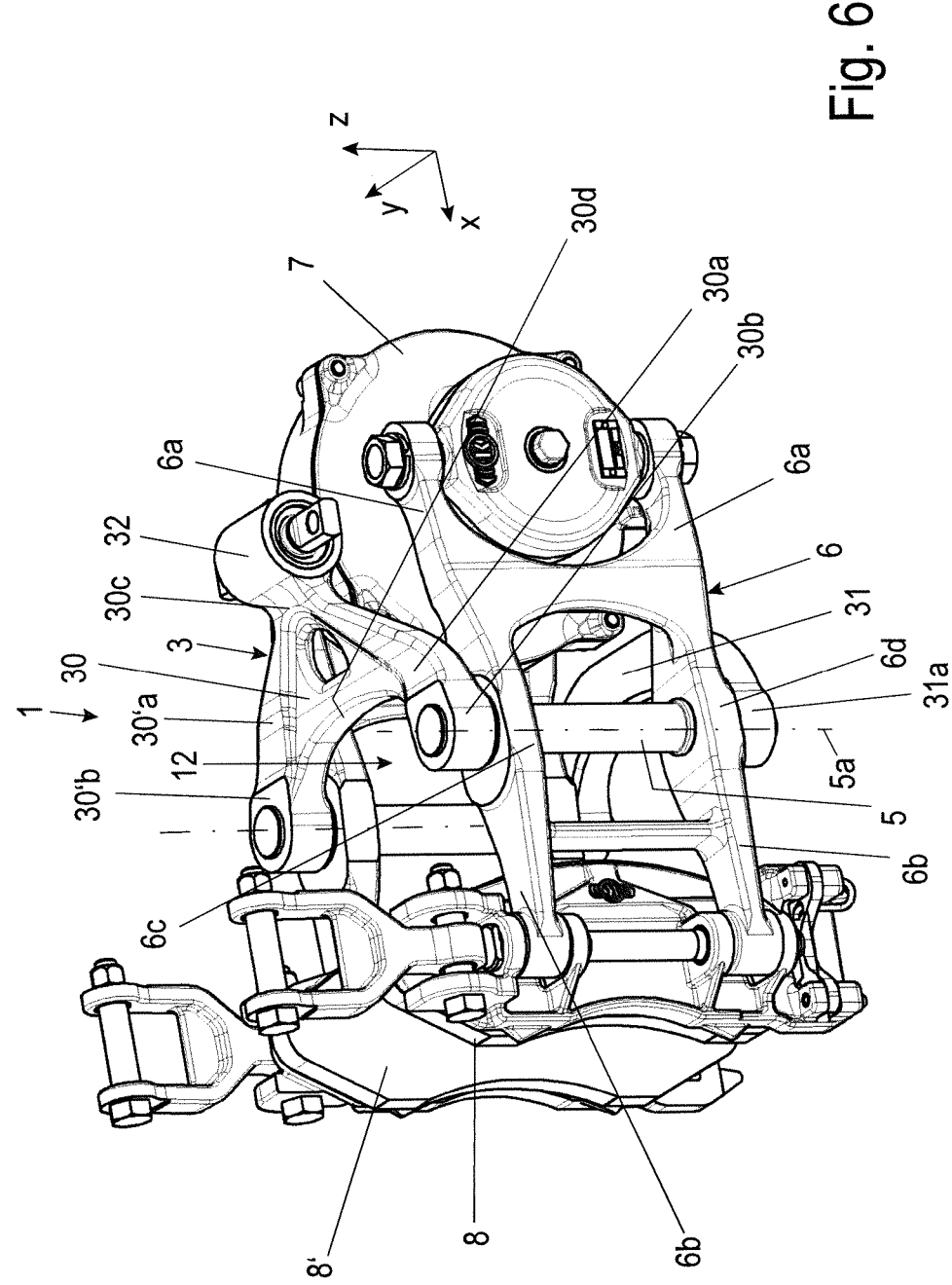
FIGS. 6 and 7 are perspective views of the embodiment of FIG. 5.

FIG. 5 shows a lateral view of an exemplary embodiment of a brake caliper 1. FIG. 6 is a perspective lateral view of the embodiment of FIG. 5, and FIG. 7 gives a perspective view of the embodiment of FIG. 5 in x-direction.

The brake caliper 1 of the disclosed embodiments includes a pull rod device 3, two vertical rods 5, 5', two brake levers 6, 6', a brake cylinder 7, and two brake pads 8, 8'. The description of these parts is already given above and will not be repeated here.

Contrary to the brake caliper 1 of the state of the art shown in FIGS. 1 to 3, the brake caliper 1 has a different pull rod device 3.

Figure 7:
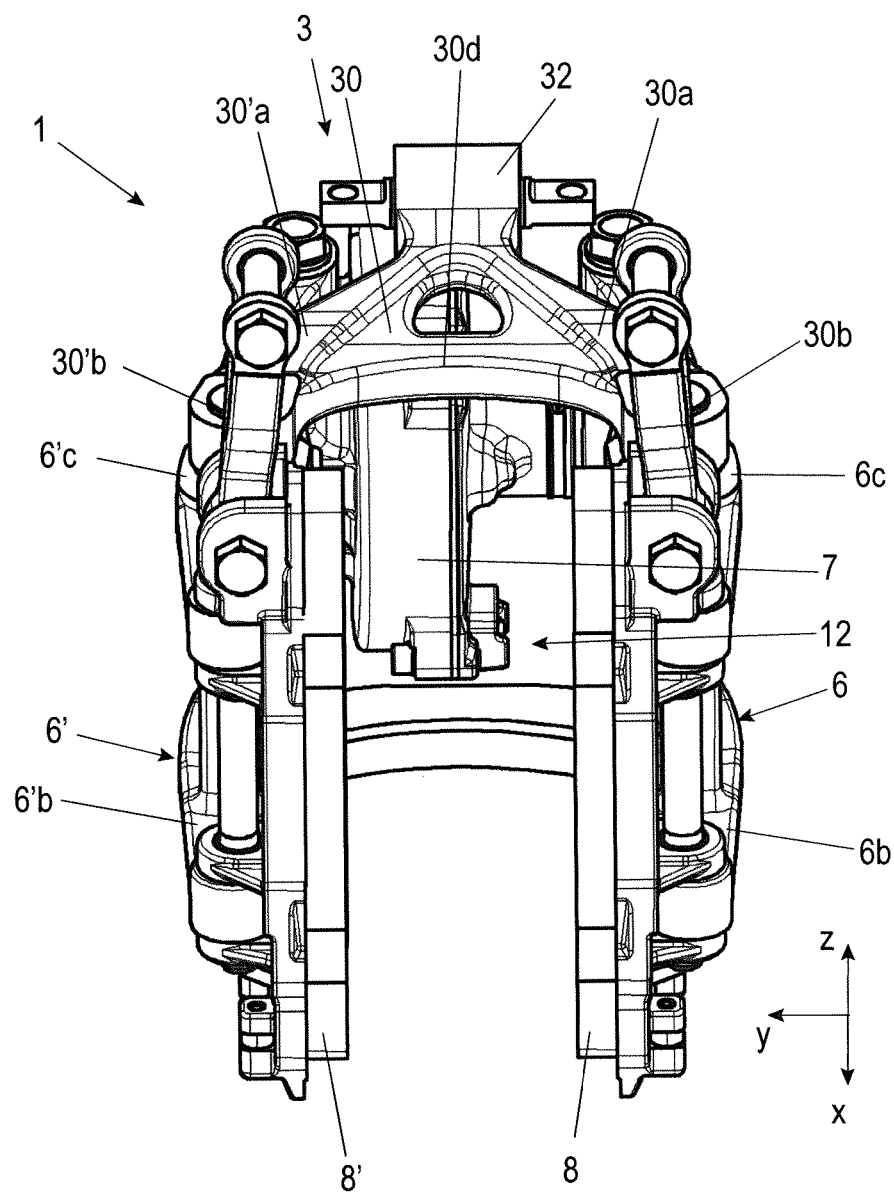
Figure 8:
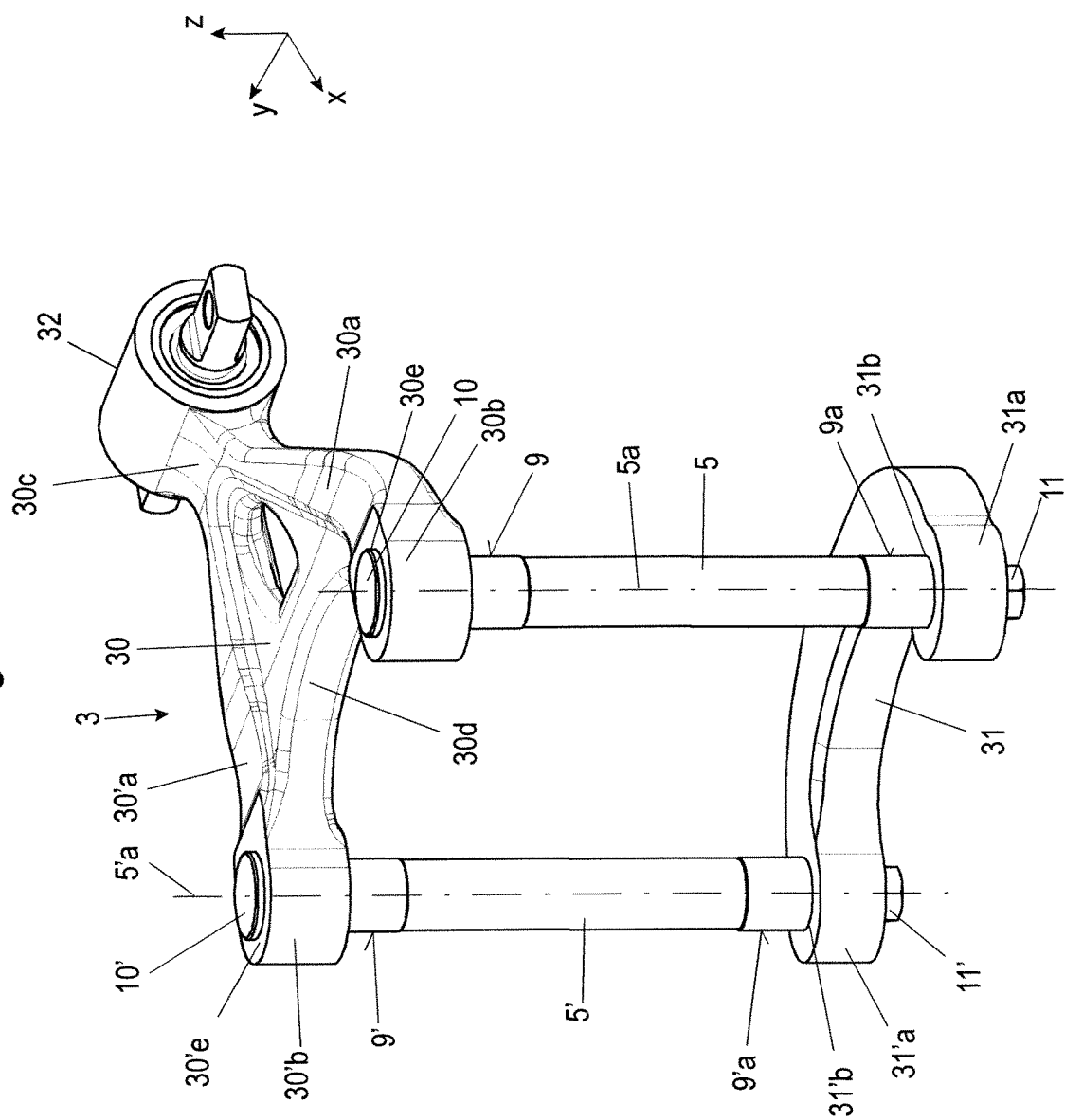
FIGS. 8 and 9 are views of an exemplary embodiment of a pull rod device of the embodiment of FIGS. 5 to 7.
Figure 9:
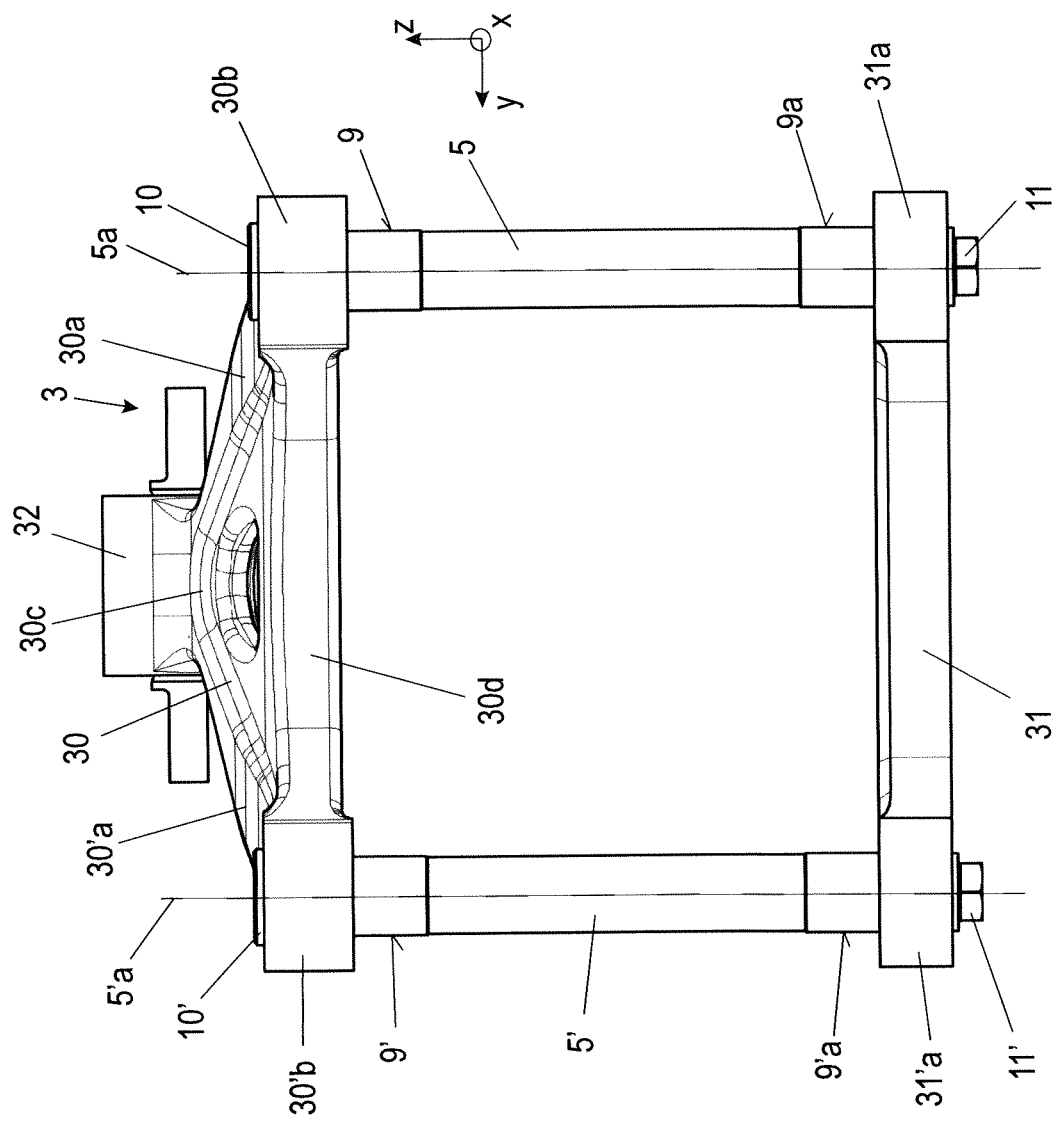

FIG. 8 is a perspective view of an exemplary embodiment of the pull rod device 30 of the embodiment of FIGS. 5 to 7. FIG. 9 gives a perspective view of the pull rod device 30 of FIG. 8 in x-direction.

The pull rod device 3 is a multi-part component. So the pull rod device 3 is realized without the vertical pull rod rib 4 of the state of the art. The pull rod device 3 is split into at least two separate parts and includes a pull rod top 30 (including a pull rod head 32), a pull rod bottom 31, and two vertical rods 5, 5'.

The vertical rods 5, 5' connect the separate parts, the pull rod top 30 and the pull rod bottom 31. In this manner, the function of the pull rod rib 4 of the state-of-the-art is taken over by the vertical rods 5, 5'.

The pull rod top 30 is arranged in an x-y-plane and has a triangular shape. Two side portions 30a, 30'a form mirror-inverted lateral triangle legs having their vertex in a connection 30c. The pull rod head 32 is attached to this connection 30c and extends in negative x-direction. The pull rod head 32 is provided for mounting of the pull rod device 3.

Each free end of the side portions 30a, 30'a points to the brake disc 2 and is connected to a respective support portion 30b, 30'b. The transition areas of each connection of the side portions 30a, 30'a and the respective support portions 30b, 30'b are spaced apart in y-direction and are connected via a cross-connector 30d as a base side of the triangle. This cross-connector 30d extends in y-direction and has a crescent-shape, which is bent away from the brake disc 2 to the connection 30c.

The ends of the cross-connector 30d form large and rounded connecting areas essentially extending over the whole length of each side portion 30a, 30'a. This is clearly shown in FIGS. 6 to 9.

Each support portion 30b, 30'b has a fastening boring 30e, 30'e in which top ends 10, 10' of the vertical rods 5, 5' are inserted.

The pull rod bottom 31 is arranged in an x-y-plane parallel to the pull rod top 30. The pull rod bottom 31 has a crescent shape, which is bent away from the brake disc 2 to the brake cylinder 7. Each end of the rod bottom 31 is connected to a respective support portion 31a, 31'a extending in x-direction.

Each support portion 31a, 31'a has a fastening boring 31b, 31'b in which bottom ends of the vertical rods 5, 5' are inserted. The fastening borings 31b, 31'b of the support portions 31a, 31'a of the pull rod bottom 31 are coaxially arranged to the fastening borings 30e, 30'e of the support portions 30b, 30'b of the pull rod top 30.

The pull rod top 30 and the pull rod bottom 31 are spaced apart from each other and connected via the vertical rods 5, 5'. The vertical rods 5, 5' are connected via their top ends 10, 10' inserted into the fastening borings 30e, 30'e to the pull rod top 30 in a way permitting to transfer vertical forces and bending moment. Optionally, these connections are press fit connections as they are insensitive against vibrations and permit the transfer of vertical forces and bending moment.

The bottom ends of the vertical rods 5, 5' are fastened to the pull rod bottom 31 in a usual way, e.g., by fastening elements 11.

Each one of the vertical rods 5, 5' has two bearings 9, 9'; 9a, 9'a next to the respective support portion 30b, 30'b; 31a, 31'a. These bearings 9, 9'; 9a, 9'a can be bushings or machined bearing surfaces, and, when assembled, they are in contact with the respective bearing portions 6c, 6'c of the brake levers 6, 6'.

The space 12 (see FIGS. 1 and 3) between the pull rod top 30 and the pull rod bottom 31 is now empty and free, as there is no pull rod rib 4 in it. In the view from the position of the brake disc 2 in FIG. 7, the brake cylinder 7 can be clearly seen through the empty space 12. Contrary to that, in the state-of-the-art pull rod device 3 according to FIGS. 3 and 4 the space 12 was occupied by the pull rod rib 4.

A weight of the pull rod device 3 is decreased due to the missing pull rod rib 4. Therefore, the brake cylinder 7 can use this space 12. As a result, the brake levers 6, 6' can be shortened in x-direction, and an installation space of the brake caliper 1 can be decreased. The shortened brake levers 6, 6' result in an additional weight decrease.

Alternative solutions can be provided for the connection of the vertical rods 5, 5' with the support portions 30b, 30'b and 31a, 31'a.

In a modification, the pull rod top 30 is a complex 3-D component. The support portions 30b, 30'b, the cross-connector 30d as well as the transition areas of each connection of the side portions 30a, 30'a, the cross-connector 30d and the respective support portions 30b, 30'b are arranged substantially in an x-y-plane, whereas the connection 30c having the vertex is arranged at a distance in positive z-direction from the x-y-plane. Each side portion 30a, 30'a extends obliquely from the respective transition areas of each connection of the side portions 30a, 30'a, the cross-connector 30d and the respective support portions 30b, 30'b to connection 30c, here upwards in positive z-direction.

Figure 10:
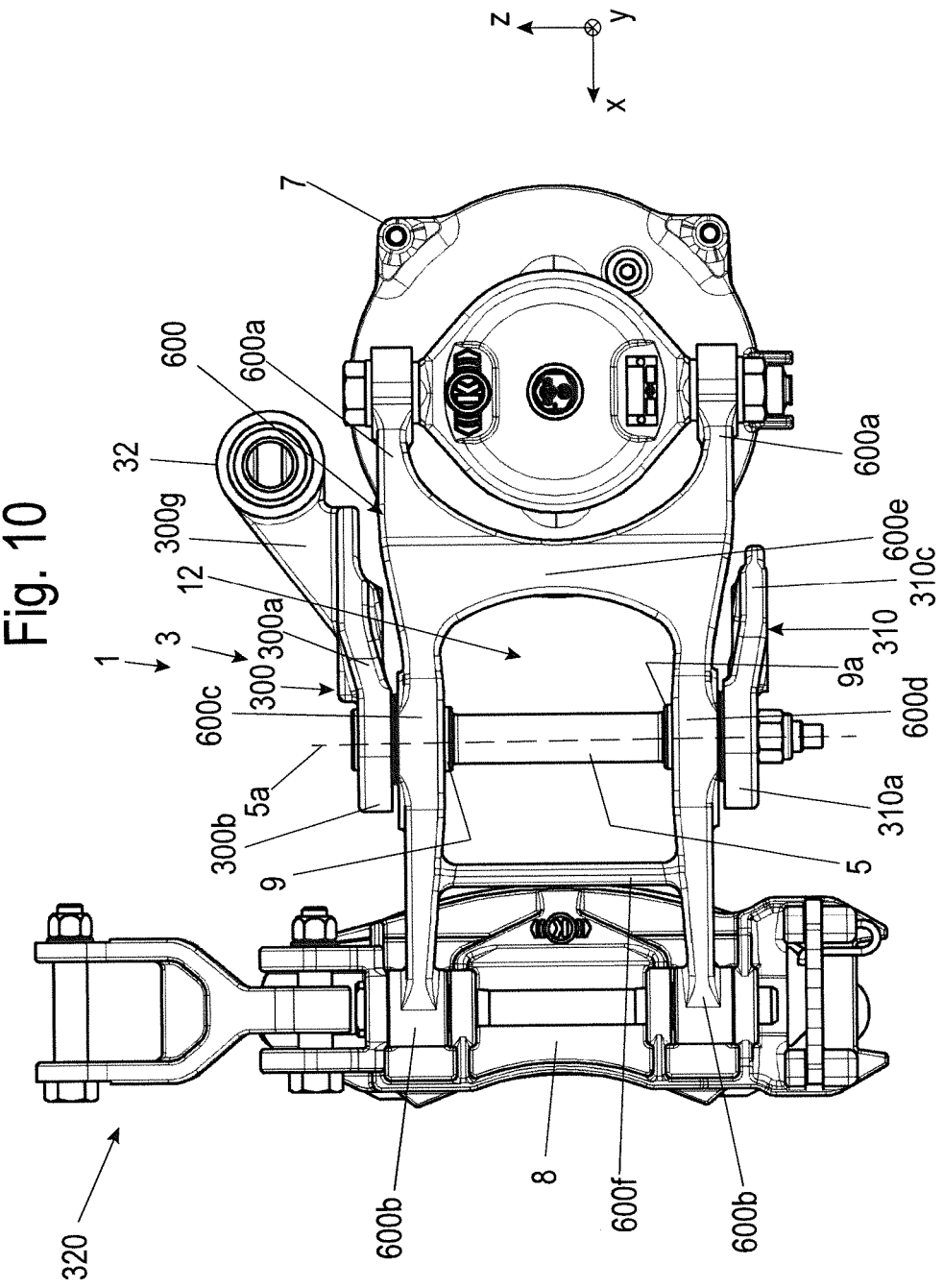
FIG. 10 shows a lateral view of a further exemplary embodiment of a brake caliper.
Figure 11:
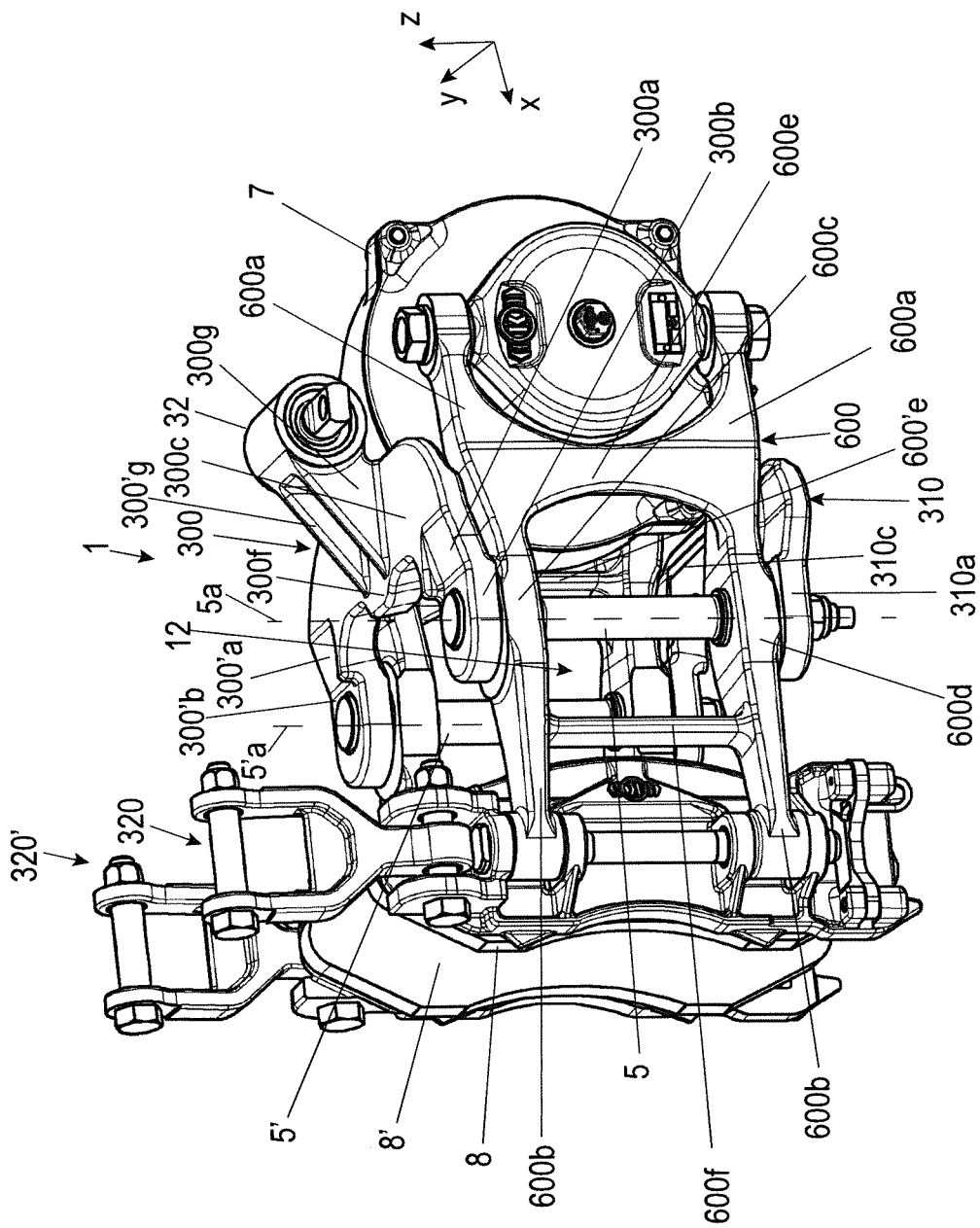
FIGS. 11 and 12 are perspective views of the further embodiment of FIG. 10.
Figure 12:
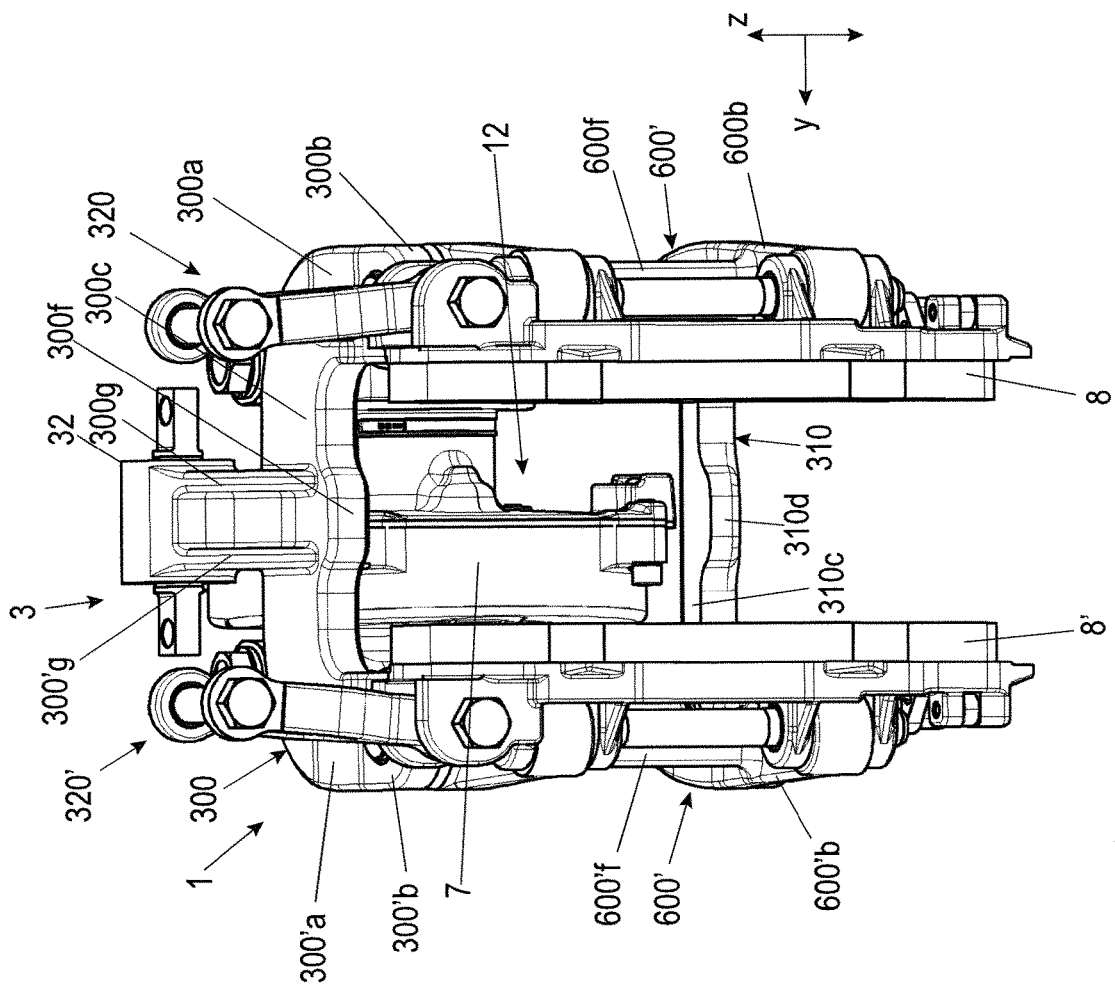

FIG. 10 shows a lateral view of a further exemplary embodiment of a brake caliper 1. FIG. 11 is a perspective lateral view of the further embodiment of FIG. 10, and FIG. 12 gives a perspective view of the further embodiment of FIG. 10 in x-direction.

The brake caliper 1 is suspended from a frame/wagon by suspension clips 320, 320' as well as via the pull rod head 32. The suspension clips 320, 320' are arranged here above the brake pads 8.

The further exemplary embodiment of the brake caliper 1 includes a pull rod device 3, two vertical rods 5, 5', two brake levers 600, 600', a brake cylinder 7, and two brake pads 8, 8'. The description of these parts is already given above and will not be repeated here. The two arrangements of the first lever arm 600a, 600'a, the second lever arm 600b, 600'b and the central bearing portion 600c, 600'c are connected via webs 600e, 600'e and 600f, 600'f. The webs 600e, 600'e next to the brake cylinder 7 are each broader in x-direction than the webs 600f, 600'f next to the brake pads 8.

Contrary to the brake caliper 1 of the exemplary embodiment of shown in FIGS. 5 to 9, the brake caliper 1 of the further exemplary embodiment has a modified pull rod device 3.

Figure 13:
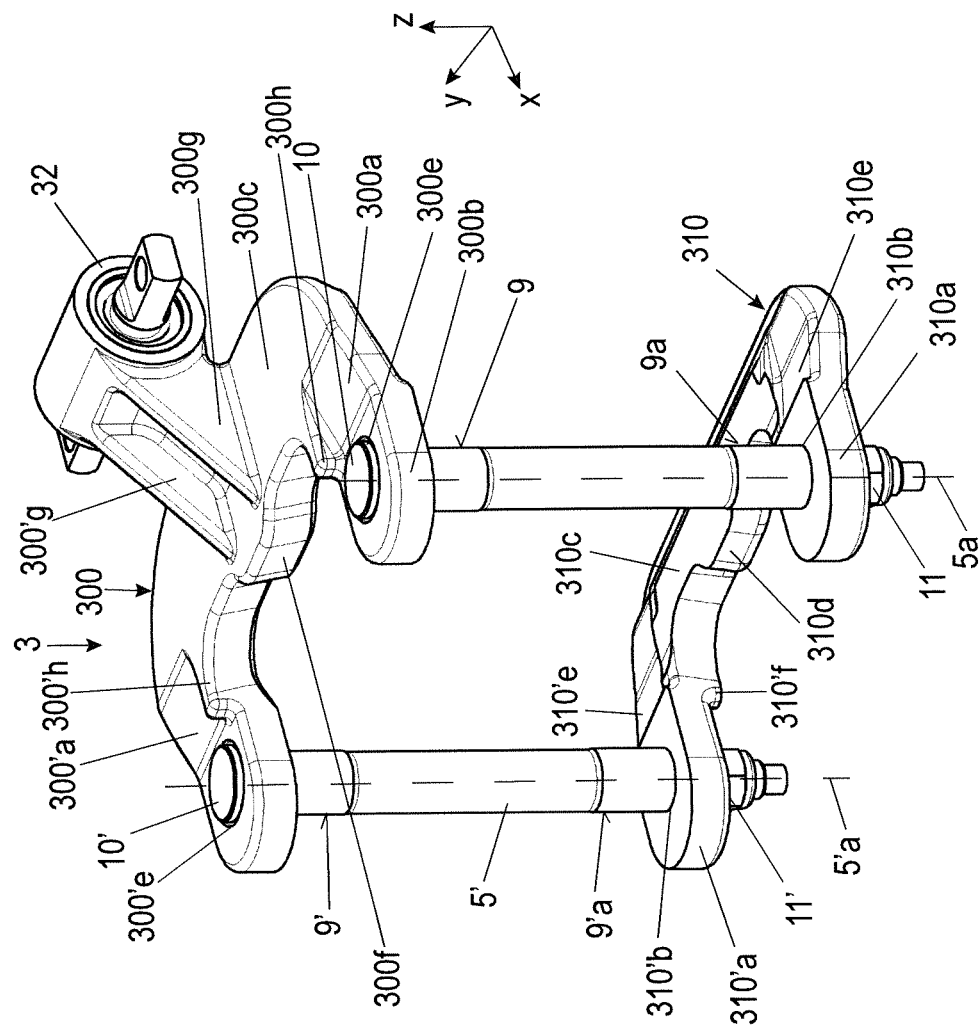
FIGS. 13 and 14 are views of a further exemplary embodiment of a pull rod device of the further embodiment of FIGS. 11 to 12.
Figure 14:
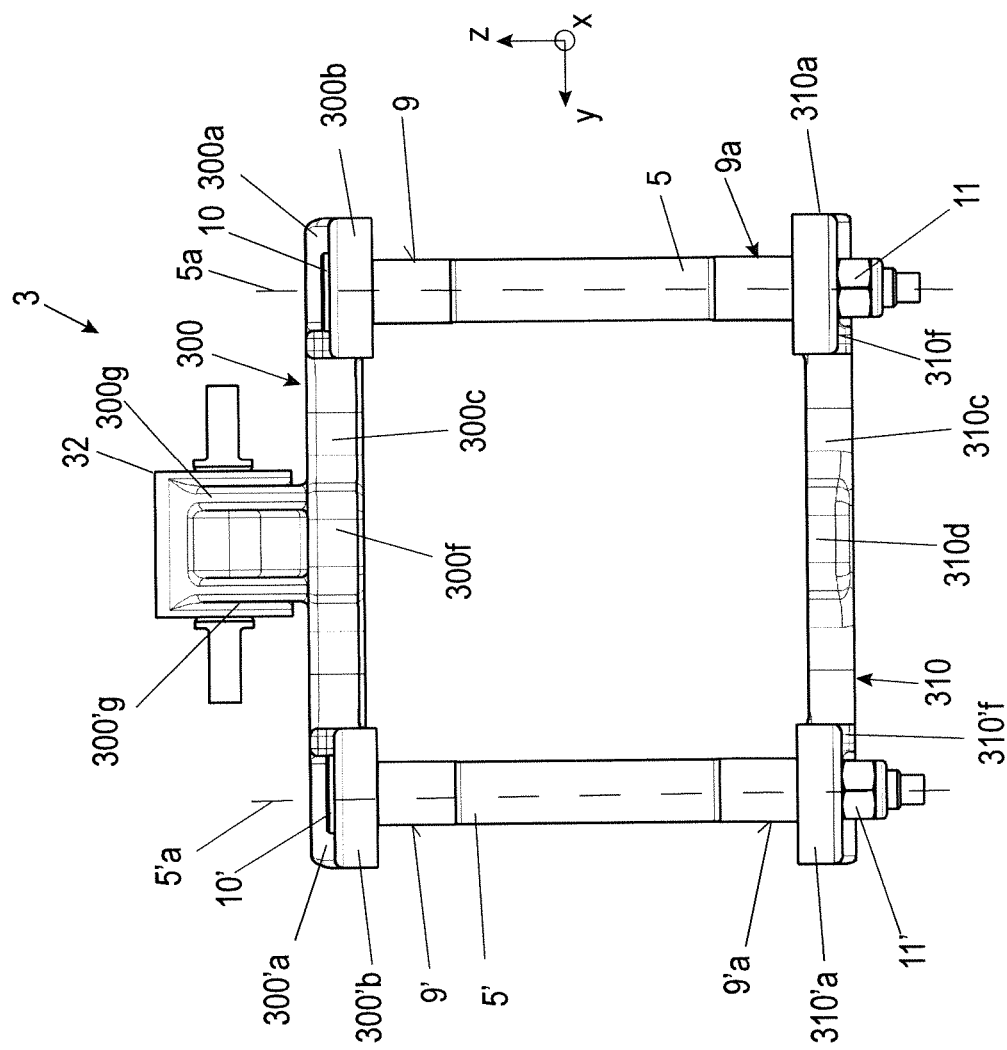

FIG. 13 is a perspective view of a further exemplary embodiment of a pull rod device 3 of the embodiment of FIGS. 10 to 12. FIG. 14 gives a perspective view of the pull rod device 300 of FIG. 13 in x-direction.

The pull rod device 3 of the further exemplary embodiment is a multi-part component. This pull rod device 3 is also realized without the vertical pull rod rib 4 of the state of the art. This pull rod device 3 is also split into at least two separate parts and includes a pull rod top 300 (including a pull rod head 32), a pull rod bottom 310, and two vertical rods 5, 5'.

The vertical rods 5, 5' of the further exemplary embodiment also connect the separate parts, the pull rod top 300 and the pull rod bottom 310 as mentioned above.

The pull rod top 300 includes two side portions 300a, 300'a, two support portions 300b, 300'b, a connection 300c and the pull rod head 32.

Each free end of the side portions 300a, 300'a points to the brake disc 2 and is connected to a respective support portion 300b, 300'b. Each other end of the side portions 300a, 300'a is connected with the connection 300c.

The connection 300c is a plate and extends in y-direction. Ends of the connection 300c pointing to the brake cylinder 8 are rounded with a large radius.

A middle part of the connection 300c is widened in x-direction. This widening 300f protrudes in x-direction and points to the brake disc 2. Two webs 300g and 300'g are fixed on top of the middle part of the connection 300c. The webs 300g, 300'g are firmly attached to the pull rod head 32. The webs 300g, 300'g are substantially triangle shaped, but they can have different shapes. The pull rod head 32 is arranged opposite the widening 300f and extends in negative x-direction.

In the example shown in FIGS. 10 to 14, the support portions 300b, 300'b and the plate-shaped connection 300c are arranged in different x-y-planes being spaced apart in positive z-direction. For this reason, the side portions 300a, 300'a are tilted upwards at an angle. Opposite inner sides of the side portions 300a, 300'a have ribs 300h, 300'h for reinforcement.

The support portions 300b, 300'b and the plate-shaped connection 300c can also be arranged in different ways.

Each support portion 300b, 300'b has a fastening boring 300e, 300'e in which a respective top end 10, 10' of the vertical rods 5, 5' is inserted.

The pull rod bottom 310 includes two support portions 310a, 310'a and a pull rod bottom body 310c.

Each support portion 310a, 310'a has a fastening boring 310b, 310'b in which bottom ends of the vertical rods 5, 5' are inserted. Here are the fastening borings 310b, 310'b of the support portions 310a, 310'a of the pull rod bottom 310 coaxially arranged to the fastening borings 300e, 300'e of the support portions 300b, 300'b of the pull rod top 300.

In this example, the support portions 310a, 310'a are arranged in an x-y-plane parallel to the support portions 300b, 300'b of the pull rod top 300.

Rounded ends of the support portions 310a, 310'a face to the brake disc 2. The other ends of the support portions 310a, 310'a are fixed to the pull rod bottom body 310c via respective connection segments 310e, 310'e.

The pull rod bottom body 310c is arranged in an x-y-plane, in this example parallel to the plate-shaped connector 300c of the pull rod top 300.

The pull rod bottom body 310c is a plate and extends in y-direction. Ends of the pull rod bottom body 310c pointing to the brake cylinder 8 are rounded with a large radius.

A middle part of the pull rod bottom body 310c is widened in x-direction. This widening 310d protrudes in x-direction and points to the brake disc 2.

In the example shown in FIGS. 10 to 14, the support portions 310a, 310'a and the plate-shaped pull rod bottom body 310c are arranged in different x-y-planes being spaced apart in negative z-direction. For this reason, connection segments 310e, 310'e are tilted downwards at an angle. Opposite inner sides of the connection segments 310e, 310'e have ribs 310f, 310'f for reinforcement.

The support portions 310a, 310'a and the plate-shaped pull rod bottom body 310c can also be arranged in different ways.

Size and shape of the pull rod top 300 (except the webs 300g, 300'g and the pull rod head 32) and of the pull rod bottom 310 can be the same, whereas the pull rod bottom 310 is arranged in a mirror-inverted way to the pull rod top 300.

The pull rod top 300 and the pull rod bottom 310 are spaced apart from each other and connected via the vertical rods 5, 5'. The vertical rods 5, 5' are connected via their top ends 10, 10' inserted into the fastening borings 300e, 300'e to the pull rod top 300 in a way permitting to transfer vertical forces and bending moment. Preferably these connections are press fit connections as they are insensitive against vibrations and permit the transfer of vertical forces and bending moment.

The bottom ends of the vertical rods 5, 5' are fastened to the pull rod bottom 310 in a usual way, e.g., by fastening elements 11.

Fastening of the ends of the vertical rods 5, 5' to the pull rod top 30, 300 and/or pull rod bottom 31, 310 can be done by press fit, threaded connection or similar.

The fastening borings 30e, 30'e; 300e, 300'e of the pull rod top 30, 300 can be arranged coaxial to the fastening borings 31b, 31'b; 310b, 310'b of the pull rod bottom 31, 310, but also in parallel. In this case, at least one of the vertical rods 5, 5' has a cranked end in z-shape.

The support portions 30b, 30'b; 300b, 300'b of the pull rod top 30, 300 as well as the support portions 31a, 31'a; 310a, 310'a of the pull rod bottom 31, 310 can be realized as parts where the fastening borings 30e, 30'e; 300e, 300'e of the pull rod top 30, 300 as well as the fastening borings 31b, 31'b; 310b, 310'b of the pull rod bottom 31, 310 are arranged.

So the vertical rods 5, 5' can be connected to the support portions 30b, 30'b and 31a, 31'a using a threaded connection. Or the vertical rods 5, 5' can be kept in place by a respective preloaded screw.

It is also possible that the vertical rods 5, 5' can consist of multiple parts, which are kept in place by a preloaded screw.

The pull rod device 3 can be modified in such a way that the suspension clips 320, 320' are connected to it. The suspension clips 320, 320' can be eliminated and the friction forces can be taken by the pull rod device 3.

The foregoing descriptions of specific embodiments have been presented for purposes of illustration and description. They are not intended to be exhaustive or to limit disclosed embodiments to the precise forms disclosed. It is obvious that many modifications and variations are possible. It is intended that the scope of the disclosed embodiments be defined by the claims appended hereto and their equivalents.

REFERENCES

1 Brake Caliper
2 Brake Disc
3 Pull Rod Device
3a Pull Rod Top
3b Pull Rod Bottom
3c Pull Rod Head
3d, 3'd; 3e, 3'e Arm
3f, 3'f Fastening Boring
4 Pull Rod Rib
5, 5' Vertical Rod
5a, 5'a Axis
6, 6'; 600, 600' Brake Lever
6a, 6'a; 6b, 6'b; 600a, 600'a; 600b, 600'b Lever Arm
6c, 6'c; 6d, 6'd; 600c, 600'c; 600d, 600'd Bearing Portion
600e, 600'e; 600f, 600'f Connection
7 Brake Cylinder
8, 8' Brake Pad
9, 9', 9a, 9'a Bearing
10, 10' Top End
11, 11' Fastening Element
12 Space
30; 300 Pull Rod Top
30a, 30'a; 300a, 300'a Side Portion
30b, 30'b; 300b, 300'b Support Portion
30c; 300c Connection
30d Cross-Connector
30e, 30'e Fastening Boring
300f Widening
300g, 300'g Web
300h, 300'h Rib
31; 310 Pull Rod Bottom
31a, 31'a; 310a, 310'a Support Portion
31b, 31'b; 310b, 310'b Fastening Boring
310c Pull Rod Bottom Body
310d Widening
310e, 310'e Connection Segment
310f, 310'f Rib
32 Pull Rod Head
320, 320' Suspension Clip
x, y, z Coordinate

The invention claimed is:

1. A pull rod device arrangement of a brake caliper comprising:
a pull rod top;
a pull rod bottom; and
two vertical rods,
wherein the pull rod top and the pull rod bottom of the pull rod device are connected to each other,
wherein the pull rod top and the pull rod bottom of the pull rod device are separate parts,
wherein the pull rod top and the pull rod bottom of the pull rod device are separate parts connected to each other by the two vertical rods,
wherein the pull rod top has a triangular shape, and
wherein two side portions form mirror-inverted lateral triangle legs having their vertex in a connection.

2. The pull rod device of claim 1, wherein each free end of the side portions is connected to a respective support portion, and wherein transition areas of each connection of the side portions and the respective support portions are spaced apart and are connected via a cross-connector.

3. The pull rod device of claim 2, characterised in that each support portion has a fastening boring, in which top ends of the vertical rods are inserted.

4. The pull rod device of claim 3, the pull rod bottom is crescent shaped, wherein each end of the rod bottom is connected to a respective support portion, each support portion having a fastening boring, in which bottom ends of the vertical rods are inserted.

5. The pull rod device of claim 4, wherein the pull rod bottom is arranged in a plane parallel to the pull rod top, the fastening borings of the support portions of the pull rod bottom being coaxially arranged to the fastening borings of the support portions of the pull rod top.

6. The pull rod of claim 3,
wherein the pull rod top and the pull rod bottom are spaced apart from each other and connected via the vertical rods that are connected via their top ends inserted into the fastening borings of the support portions of the pull rod top, wherein the vertical rods are connected via their bottom ends inserted into the fastening borings of the support portions of the pull rod bottom.

7. The pull rod device of claim 6, wherein the top ends of the vertical rods are connected to the support portions of the pull rod top via press fit connections, and wherein the bottom ends of the vertical rods are fastened to the support portions of the pull rod bottom by fastening elements.

8. The pull rod device of claim 2, wherein the cross-connector has a crescent-shape bent to the connection.

9. The pull rod device of claim 1, wherein the pull rod top includes two side portions, two support portions, a connection and a pull rod head, wherein each free end of the side portions is connected to a respective support portion and each other end of the side portions is connected with the connection, wherein each support portion has a fastening boring, in which top ends of the vertical rods are inserted.

10. The pull rod device of claim 9, wherein the pull rod bottom includes two support portions and a pull rod bottom body wherein ends of the two support portions are fixed to the pull rod bottom body via respective connection segments, each support portion having a fastening boring, in which bottom ends of the vertical rods are inserted.

11. The pull rod device of claim 10, wherein a middle part of the pull rod bottom body is widened.

12. The pull rod device of claim 10, wherein the pull rod top and the pull rod bottom are spaced apart from each other and connected via the vertical rods, the vertical rods being connected via their top ends inserted into the fastening borings of the support portions of the pull rod top and being connected via their bottom ends inserted into the fastening borings of the support portions of the pull rod bottom.

13. The pull rod device of claim 9, wherein a middle part of the connection of the pull rod top is widened, wherein a pull rod head is attached to the connection and is provided for mounting the pull rod device.

14. The pull rod device of claim 9, wherein the top ends of the vertical rods are connected to the support portions of the pull rod top via press fit connections, and that the bottom ends of the vertical rods are fastened to the support portions of the pull rod bottom by fastening elements.

15. The pull rod device of claim 1, further comprising a pull rod head attached to the connection provided for mounting the pull rod device.

16. The pull rod device of claim 1, wherein at least one of the connections of the vertical rods to one of the support portions is a threaded connection.

17. The pull rod device of claim 1, wherein at least one of the vertical rods comprises multiple parts, which are kept in place by a preloaded screw.

18. The pull rod device of claim 1, wherein suspension clips of an associated brake caliper are connected the pull rod device.

19. A brake caliper comprising:
- a pull rod device, two vertical rods, two brake levers, a brake cylinder, and two brake pads,
- wherein the pull rod device includes a pull rod top and a pull rod bottom, the pull rod top and the pull rod bottom being separate parts,
- wherein the pull rod top and the pull rod bottom of the pull rod device are separate parts connected to each other by the two vertical rods, and
- wherein the pull rod top has a triangular shape, and wherein two side portions form mirror-inverted lateral triangle legs having their vertex in a connection.

* * * * *